(12) United States Patent
Ishigaki et al.

(10) Patent No.: US 10,236,696 B2
(45) Date of Patent: Mar. 19, 2019

(54) SYSTEM AND METHOD FOR CONTROLLING A MODULAR ENERGY MANAGEMENT SYSTEM THAT CONTROLS AN AMOUNT OF POWER TRANSFERRED FROM EACH OF THE ENERGY MODULES TO AT LEAST ONE LOAD

(71) Applicant: TOYOTA MOTOR ENGINEERING & MANUFACTURING NORTH AMERICA, INC., Erlanger, KY (US)

(72) Inventors: Masanori Ishigaki, Ann Arbor, MI (US); Jongwon Shin, Ann Arbor, MI (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 371 days.

(21) Appl. No.: 15/057,151

(22) Filed: Mar. 1, 2016

(65) Prior Publication Data
US 2017/0256946 A1 Sep. 7, 2017

(51) Int. Cl.
| | | |
|---|---|---|
| *H02J 7/00* | (2006.01) | |
| *G05B 15/02* | (2006.01) | |
| *H02J 3/32* | (2006.01) | |
| *H02J 7/04* | (2006.01) | |
| *H02J 7/34* | (2006.01) | |

(52) U.S. Cl.
CPC ............ *H02J 7/0031* (2013.01); *G05B 15/02* (2013.01); *H02J 3/32* (2013.01); *H02J 7/0021* (2013.01); *H02J 7/0029* (2013.01); *H02J 7/0047* (2013.01); *H02J 7/0091* (2013.01); *H02J 7/047* (2013.01); *H02J 7/345* (2013.01)

(58) Field of Classification Search
CPC . G05B 15/02; H02J 3/32; H02J 7/0031; H02J 7/0091; H02J 7/345; H02J 7/047; H02J 7/0047; H02J 7/0029; H02J 7/0021; Y02B 70/3291; Y02B 70/346; Y02B 90/222; Y04S 10/24; Y04S 10/52; Y04S 20/12
USPC ......................................................... 700/295
See application file for complete search history.

(56) References Cited

U.S. PATENT DOCUMENTS 7,839,018 B2 * 11/2010 Chen ................. H01M 8/04537
307/44
8,324,868 B2 12/2012 Choi et al.
(Continued)

OTHER PUBLICATIONS

U.S. Appl. No. 14/504,125, filed Oct. 1, 2014, Masanori Ishigaki.
(Continued)

*Primary Examiner* — David Lam
(74) *Attorney, Agent, or Firm* — Oblon, McClelland, Maier & Neustadt, L.L.P.

(57) ABSTRACT

A system includes energy modules configured to output power to electrical loads based on load demands. The system also includes control circuitry configured to control an amount of power transferred from each of the energy modules to the at least one load based on received sensor data from the energy modules, detect failure of at least one source cell of the energy modules based on the received sensor data from the energy modules, and control a voltage supplied by the energy modules to the at least one load within a predetermined operating band when the failure is detected.

19 Claims, 10 Drawing Sheets

(56) References Cited

U.S. PATENT DOCUMENTS

| | | |
|---|---|---|
| 8,410,755 B2 | 4/2013 | Chau |
| 8,866,445 B2 | 10/2014 | Carder |
| 9,800,087 B2 * | 10/2017 | Kouroussis ............ H02J 9/061 |
| 2011/0278938 A1 | 11/2011 | McCleer |
| 2014/0125284 A1 | 5/2014 | Qahouq |
| 2015/0239366 A1 | 8/2015 | Jestin et al. |
| 2015/0306973 A1 | 10/2015 | Gunnerud et al. |

OTHER PUBLICATIONS

U.S. Appl. No. 14/670,138, filed Mar. 26, 2015, Masanori Ishigaki, et al.

* cited by examiner

SYSTEM AND METHOD FOR CONTROLLING A MODULAR ENERGY MANAGEMENT SYSTEM THAT CONTROLS AN AMOUNT OF POWER TRANSFERRED FROM EACH OF THE ENERGY MODULES TO AT LEAST ONE LOAD

CROSS-REFERENCE TO RELATED PATENT APPLICATIONS

The present application incorporates by reference the entire contents of U.S. patent application Ser. No. 14/504,125 having common inventorship with the present application and filed in the U.S. Patent and Trademark Office on Oct. 1, 2014. The present application also incorporates the entire contents of U.S. patent application Ser. No. 14/670,138 having common inventorship with the present application and filed in the U.S. Patent and Trademark Office on Mar. 26, 2015.

BACKGROUND

Battery cell failures in energy management systems result in a deficiency in the voltage supplied to electrical loads. U.S. Pat. No. 8,324,868 to Choi et al. describes a modular energy management system that detects failure conditions in battery cells based on temperature and controls alignment of the battery modules supplying system loads so that the supply voltage is unaffected by failed battery cells.

SUMMARY

In an exemplary implementation, a system can include energy modules that can output power to electrical loads based on load demands. The system can also include control circuitry configured to control an amount of power transferred from each of the energy modules to the at least one load based on received sensor data from the energy modules, detect failure of at least one source cell of the energy modules based on the received sensor data from the energy modules, and control a voltage supplied by the energy modules to the at least one load within a predetermined operating band when the failure is detected.

The energy modules can include at least one source cell configured to provide power to the at least one load; DC-DC power conversion circuitry configured to convert a voltage of the at least one source cell to a voltage of the energy management bus; and at least one sensor device configured to measure at least one of a temperature, the voltage, a current, a rate of power discharge, or a state of charge of the energy modules. The at least one source cell can include a battery cell, a solar cell, a fuel cell, or an AC charging cell.

The system can align power to the at least one load from one or more additional energy modules or subsystems when the failure is detected.

The system can also output a current command to modify an amount of power supplied by the energy modules based on at least one of a sensed current, a requested current, a sensed voltage, or a requested voltage.

The system can also operate in a normal operation mode when a difference between a requested voltage and a sensed voltage for one of the energy modules is less than or equal to a predetermined threshold or zero. The control circuitry can output a current command to modify the amount of power supplied by the energy modules based on a difference between a requested current and a sensed current when operating in the normal operation mode.

Failure of at least one source cell of the energy modules can correspond to an open failure.

The system can operate in a failure mode when a difference between a requested voltage and a sensed voltage for one of the energy modules is greater than a predetermined threshold. The control circuitry can output a current command to modify the voltage supplied by the energy modules based on a sensed current minus the difference between the requested voltage and the sensed voltage. The control circuitry is can also set a requested current equal to zero when operating in the failure mode.

The system can determine that an under voltage failure has occurred when a direction of power flow is from the energy modules to the at least one load and the sensed voltage is less than a lower voltage threshold of the predetermined operating band. The control circuitry can set the requested voltage equal to the lower voltage threshold when the under voltage failure occurs.

The system can determine that an over voltage failure has occurred when a direction of power flow is from the at least one load to the energy modules and the sensed voltage is greater than an upper voltage threshold of the predetermined operating band. The control circuitry is can set a requested voltage equal to the upper voltage threshold when the over voltage failure occurs.

The system can determine an upper voltage threshold and a lower voltage threshold of the predetermined operating band based on a voltage of the at least one load and a number of the energy modules supplying power to the at least one load.

The system can predict a current command corresponding to the amount of power or voltage supplied by the energy modules based on a requested current and a sensed voltage.

A further implementation includes a process for controlling a modular energy management system including controlling an amount of power transferred from energy modules to at least one load based on received sensor data from the energy modules; detecting failure of at least one source cell of the energy modules based on the received sensor data from the energy modules; and controlling a voltage supplied by the energy modules to at the least one load within a predetermined operating band when the failure is detected. A non-transitory computer-readable storage medium including executable instructions, which when executed by circuitry, can cause the circuitry to perform the process.

A further exemplary implementation can include a system controller including circuitry configured to control an amount of power transferred from energy modules to at least one load based on received sensor data from the energy modules, detect failure of at least one source cell of the energy modules based on the received sensor data from the energy modules, and control a voltage supplied by the energy modules to the at least one load within a predetermined operating band when the failure is detected.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
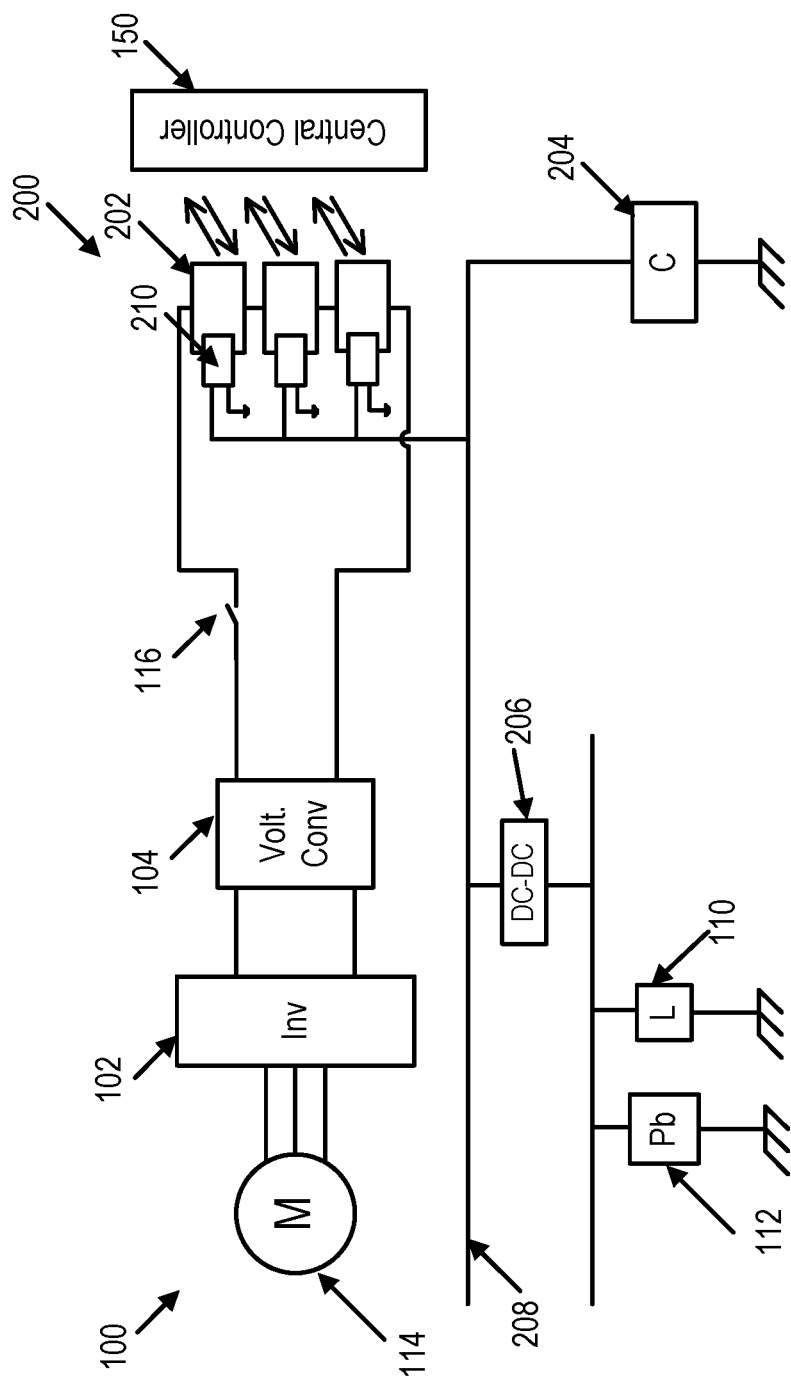
FIG. 1 is an exemplary schematic diagram of a modular energy management system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1 is an exemplary illustration of a modular energy management system 100 for a hybrid vehicle (HV). The modular energy management system 200 includes at least one battery module 202 that provides power to an inverter 102 and motor 114 via a voltage converter 104 and high voltage relay 116. In some implementations, the high voltage relay 116 includes at least one switch that aligns power to a vehicle drive train based on a control signal from a central controller 150. In addition, the at least one battery module 202 is an energy module that includes at least one battery cell, a local controller, and a modular DC-DC converter 210 that converts the DC voltage from the battery module 202 to an energy management bus 208. The energy management system 100 can also include other types of energy modules such as solar cell modules, fuel cell modules, AC charging cell modules, or any other type of energy module that also include an energy source, a local controller, and the modular DC-DC converter 210. In one implementation, the modular DC-DC converter 210 is an isolated DC-DC converter. In some implementations, the modular DC-DC converter 210 converts a higher DC voltage at the at least one battery module 202 to a lower voltage at the energy management bus 208. The at least one battery module 202 can be connected in series or parallel based on the power specifications of the modular energy management system 200.

The central controller 150 and local controllers for the at least one battery module 202 manage the power output from the at least one battery module 202 as well as power demands of the one or more electrical loads 110 to provide droop control for the energy management bus 208, detect failures in any of the battery modules 202, and compensate for the detected failures to maintain a predetermined voltage supplied to the voltage converter 104 or the one or more electrical loads 110. In addition, the local controllers for the at least one battery module 202 communicate sensor data gathered by sensor devices of the energy modules to the central controller 150 that include diagnostic information, state of charge (SOC), rate of power discharge, battery cell voltage, current, or the like.

In some implementations, the energy management bus 208 is a DC bus that connects the at least one battery module 202 to the one or more electrical loads 110 via a DC-DC converter 206. In some aspects, the DC-DC converter 206 is a non-isolated DC-DC converter that can perform DC-DC conversion at higher speeds than isolated DC-DC converters. The DC-DC converter 206 can convert a higher DC voltage at the energy management bus 208 to a lower voltage that corresponds to the voltage of the one or more electrical loads 110.

In addition, a power storage device 204 is also connected to the energy management bus 208. In some implementations, the power storage device 204 can be a capacitor, an electric double layer capacitor (EDLC), a lithium-ion capacitor, or any other type of power storage device. The type of power storage device 204 used in the modular energy management system 200 can be based on rates of power transfer and how much of an effect power transients have on the energy management bus 208. The power storage device 204 can reduce the effects of power transients that occur at the energy management bus 208 and assist in maintaining an approximately constant average voltage at the energy management bus 208. In some aspects, the effects of power transients on the energy management bus 208 can be referred to as "peaky power." By reducing the effects of peaky power on the energy management bus 208, the power storage device 204 reduces stresses on the at least one battery module 202 and the Pb battery 112.

For example, power demands of the one or more electrical loads 110 can vary based on the number of energized loads, load settings, and the like. As the load demands on the modular energy management system 100 change, a response time by the modular DC-DC converter 210 of the at least one battery module 202 that is slower than the increase in load demand may cause power transients to develop at the energy management bus 208. Stored energy from the power storage device 204 can be output to reduce the magnitude of the power transients. The power storage device 204 can also absorb excess power as load demands on the modular energy management system 200 are reduced. The modular energy management system 200 also includes a lead (Pb) battery that also supplies power to the one or more electrical loads 110. The modular energy management system 100 is one possible configuration of a modular energy management system, and the processes described further herein can also be implemented on other modular energy management system configurations.

In addition, power flow between energy modules and loads of the modular energy management system 100 can be controlled via control signals issued by the central controller 150. The central controller 150 can be an electronic control unit (ECU) with control circuitry that determines rates of power transfer for the power sources, such as from the battery modules 202 to the motor 114 or the one or more electrical loads 110. The central controller 150 also issues control signals to align power flow from energy modules 302 to the one or more electrical loads 110 based on current demands of the modular energy management system 200. In addition, the central controller 150 can detect faults in the energy modules of the energy management system 100, such as an open failure of one of the battery modules 202 and realign power flow to provide a voltage to the one or more electrical loads 110 or motor 114 within a predetermined voltage range. Details regarding processes performed by the central controller 150 are discussed further herein.

The central controller 150 communicates with the energy modules, such as the at least one battery module 202, via a transceiver (not shown). The transceiver can include at least one transmitter and receiver antenna to exchange data between the central controller 150 and the energy modules. For example, the local controller of the at least one battery module 202 can transmit diagnostic information to the central controller 150, and the control circuitry of the central controller 150 can determine whether the energy module has failed based on the received diagnostic information. The transceiver can also be implemented as separate transmitter and receiver devices according to some implementations.

Figure 2:
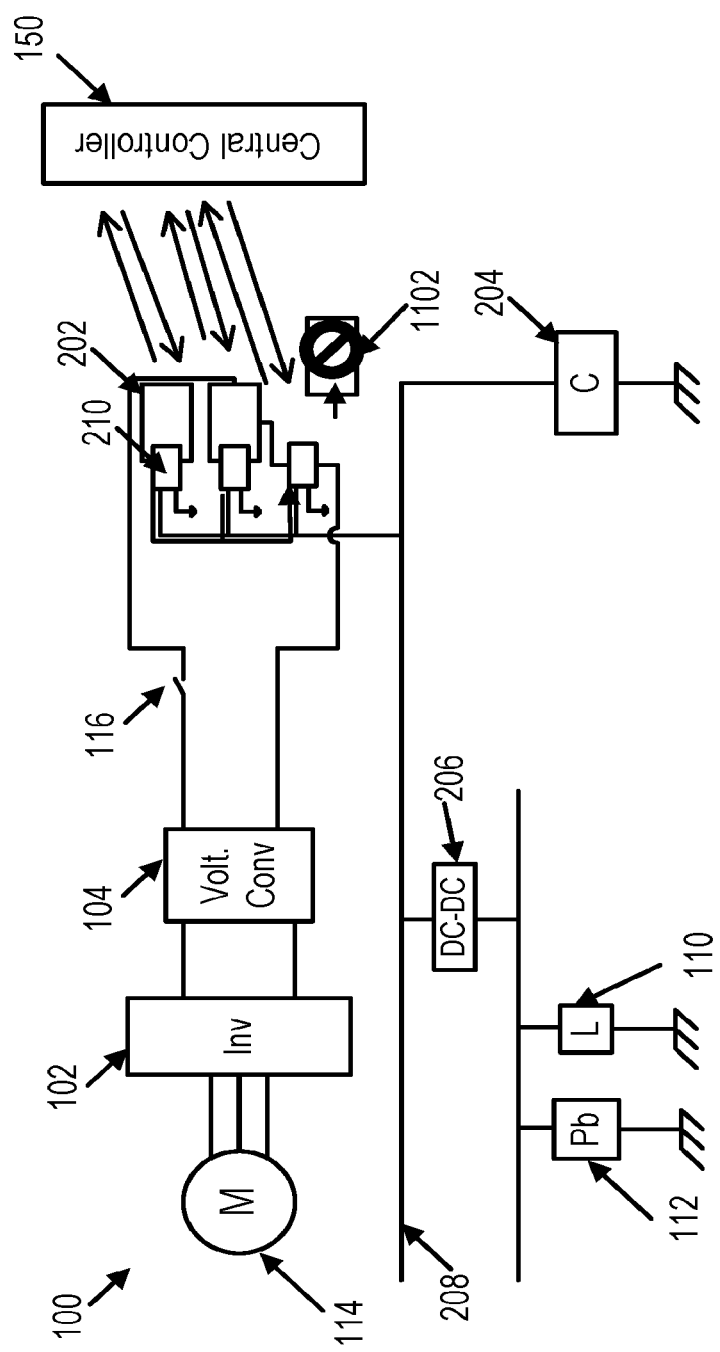
FIG. 2 is an exemplary schematic diagram of a modular energy management system in a failure mode.

FIG. 2 is an exemplary illustration of the modular energy management system 100 with a damaged battery module 1102, such as a battery module that has failed open. If the central controller 150 determines that the battery module 1102 is damaged, the central controller 150 issues a control signal to electrically disconnect the damaged battery module 1102 from the modular energy management system 200. The modular isolated DC-DC converter 210 for the damaged battery module 1102 and the at least one undamaged battery module 202 compensate for the loss of the damaged battery module, and the at least one undamaged battery module 202 can continue to provide power to the vehicle drive train and the energy management bus 208. Details regarding the compensation for the damaged battery module are discussed further herein.

Figure 3B:
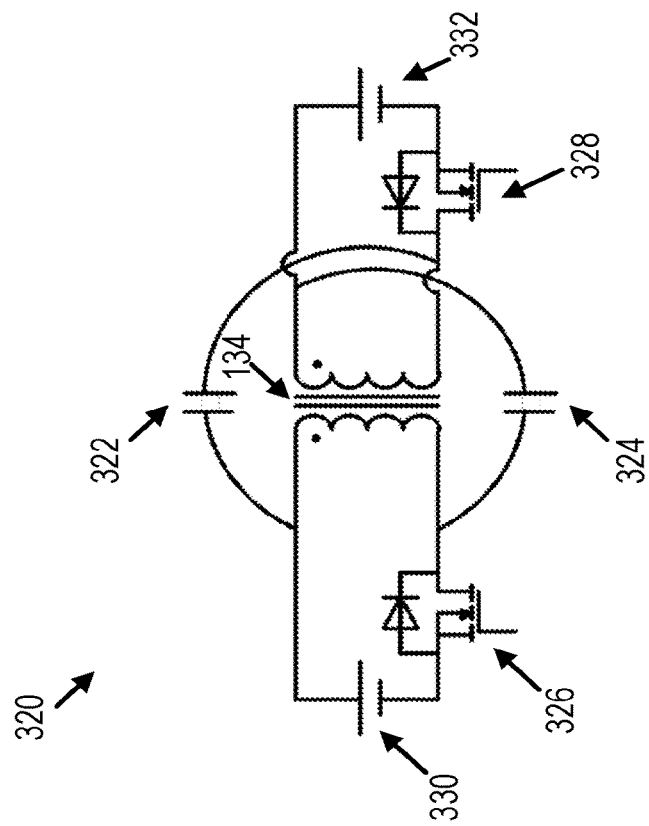
FIG. 3B is an exemplary schematic diagram of a DC-DC power conversion circuit.
Figure 3A:
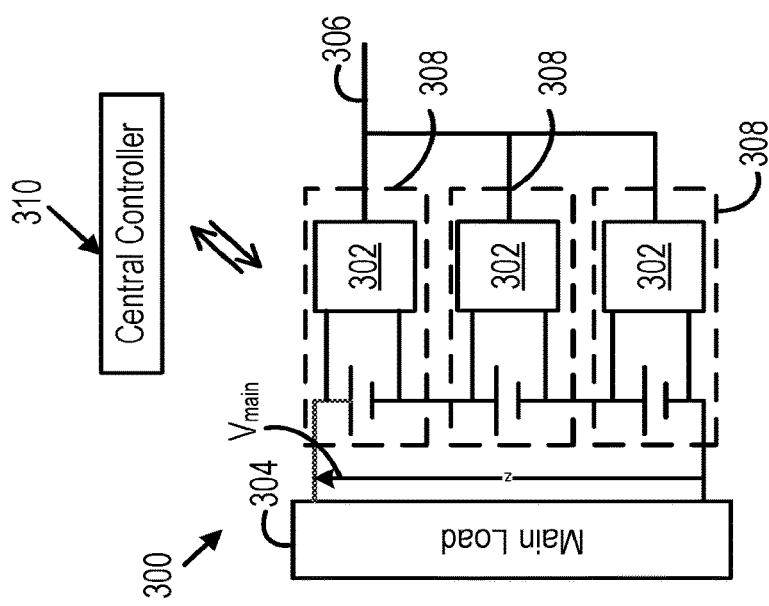
FIG. 3A is an exemplary schematic diagram of a modular energy management system.

FIG. 3A is an exemplary schematic diagram of a modular energy management system 300. The modular energy management system 300 is a simplified implementation of the modular energy management system 100. For example, three energy modules 308 are connected in series and provide power to a main load 304 and one or more subsystem loads 306. In addition, each of the energy modules 308 includes an energy source such as a battery cell, solar cell, fuel cell, or AC charging cell, a local controller, and a modular DC-DC converter 302. The modular DC-DC converter 302 provides bi-directional power transfer between the energy modules 308, the main load 304, and the subsystem loads 306. Like the central controller 150 in the modular energy management system 100, central controller 310 controls power flow between the energy modules 308, the main load 304, and the subsystem loads 306. The main load 304 and the subsystem loads 306 can be any type of electric load in a vehicle, but in one implementation, the subsystem loads 306 are auxiliary loads of a vehicle, such as a security system or driver alert system, and the main load 304 is a load associated with operating a vehicle drive train. The local controller of the energy modules 308 and the central controller 310 can be configured with transceivers to exchange data, control signals, and the like. In some implementations, the central controller 310 and the local controllers can be electrically connected via a hard wire connection or a wireless connection.

In some implementations, the central controller 310 aligns power flow from each of the energy modules 304 to provide a predetermined amount of voltage to the main load 304. For example, if the main load 304 has an operating voltage of 30 volts (V), each of the three energy modules 308 can be aligned to output 10V to the main load 304, which corresponds to a total voltage of 30V output to the main load 304. In addition, the energy modules 308 may be aligned to output different amounts of voltage or power to the main load 304 based on state of charge, time in service, or other state of health properties of the energy modules 308.

FIG. 3B is an exemplary illustration of an isolated DC-DC power conversion circuit 320, which is one implementation of the modular DC-DC power converter 302 of the modular energy management system 300. The isolated DC-DC power conversion circuit 320 can include a primary side and a secondary side that are symmetrical on either side of a magnetic core transformer 334. In an exemplary implementation, capacitors 322 and 324 can be cross-connected across the magnetic core transformer 334. The primary side can include a primary switch 326 and a primary DC power source 330, and the secondary side can include a secondary switch 328 and a secondary DC power source 332. The primary DC power source 330 and the secondary DC power source 332 can function as either a power source or a power sink depending on the direction of power transfer through the DC-DC power conversion circuit 320. In an implementation, the capacitance values of the cross-connected capacitors 322 and 324 can be equal. The primary switch 326 and the secondary switch 328 can include a MOSFET with a diode connected from the source to the drain of the MOSFET. In some aspects, the turn ratio N of the magnetic core transformer 334 is determined based on the ratio of the voltage of the primary DC power source 330 to the voltage of the secondary DC power source 332.

In certain implementations, the isolated DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during discharge.

In order to allow the electrical components to operate as either power sources or electrical loads, the isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 326 or the secondary switch 328 is turned on and off. For example, if power is being transferred from the primary side to the secondary side, the primary switch 326 is cycled on and off. If power is being transferred from the secondary side to the primary side, the secondary switch 328 is cycled on and off. In some implementations, the primary switch 326 and secondary switch 328 are controlled by gate drivers that are integrated into the primary switch 326 and the secondary switch 328.

Figure 4B:
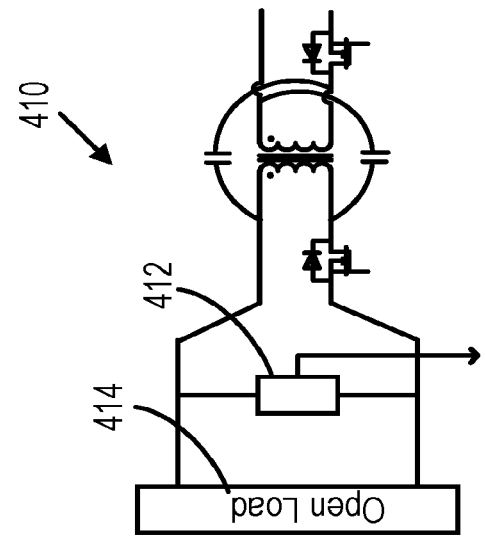
FIG. 4B is an exemplary schematic diagram of a DC-DC power conversion circuit.
Figure 4A:
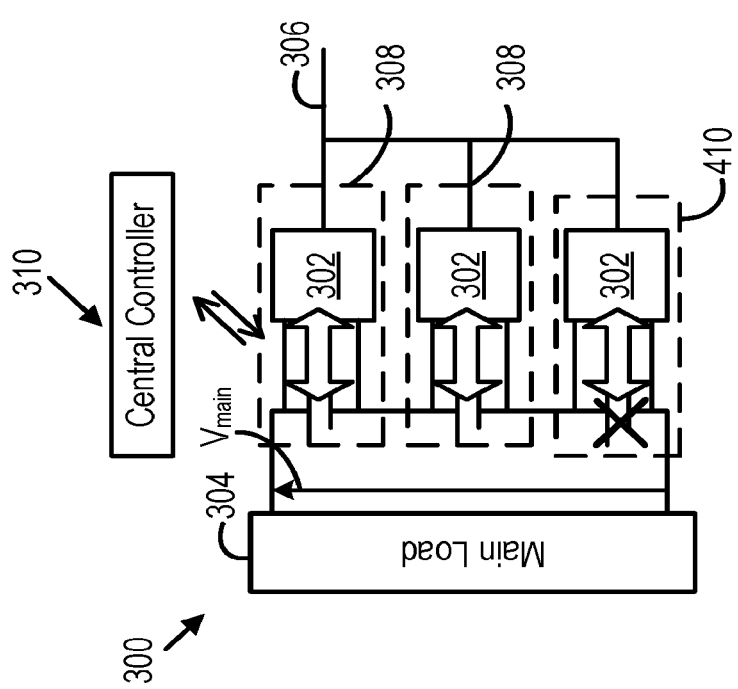
FIG. 4A is an exemplary schematic diagram of a modular energy management system in a failure mode.

FIG. 4A is an exemplary schematic diagram of the modular energy management system 300 with a damaged energy module 410, such as a battery module that has failed open. The failed energy module 410 cannot be used to transfer power to the main load 304, and the total voltage $V_{main}$ supplied to the main load 304 may decrease lower than a minimum operating voltage for the main load 304. For example, if the operating voltage of the main load 304 is 30V and the energy module 410 fails open, then the total voltage supplied by the remaining energy modules 308 is equal to 20V, which may be less than the minimum operating voltage for the main load 304 and may result in shutdown of the main load 304.

FIG. 4B is an exemplary schematic diagram of a DC-DC power conversion circuit 410, which is one implementation of the modular DC-DC converter 302. In some implementations, the DC-DC power conversion circuit 410 corresponds to the modular DC-DC converter 302 of the energy module 410 that has failed open and outputs an open load voltage 414. In addition, the DC-DC power conversion circuit can include a sensor device such as voltage sensor 412 on each side of the DC-DC power conversion circuit 410 that can sense a voltage $V_{sens}$ on the primary or secondary side of the DC-DC power conversion circuit 410. The voltage sensor 412 can output the sensed voltage $V_{sens}$ to the local controller of the energy module 410 and/or central controller 310. The central controller 310 can determine that the energy module 410 has failed open based on the sensed voltage $V_{sens}$ and can reconfigure the direction of power flow within the modular energy management system 300 to maintain the voltage supplied to the main load 304 within a predetermined normal operating voltage band.

Figure 4C:
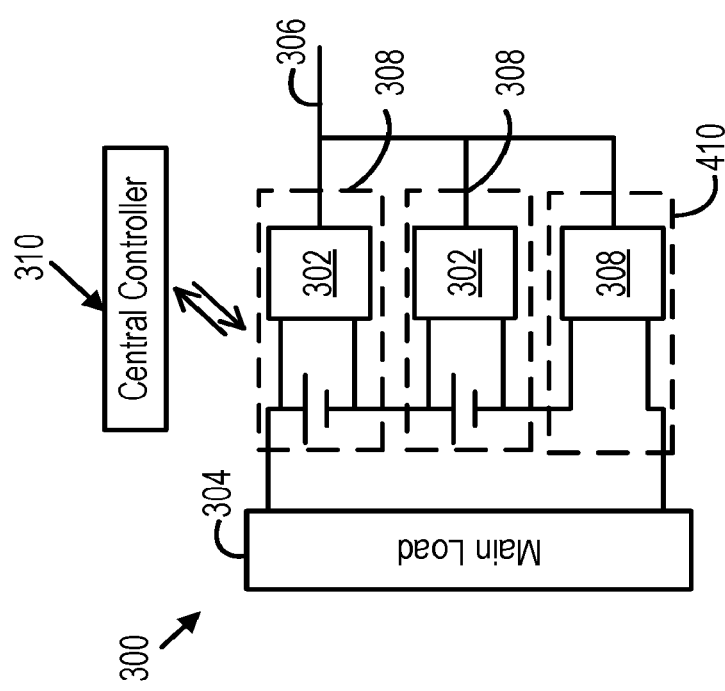
FIG. 4C is an exemplary schematic diagram of a modular energy management system in a failure mode.

FIG. 4C is an exemplary schematic diagram of the modular energy management system 300 that represents energy flow between the energy modules 308, damaged energy module 410, main load 304, and subsystem loads 306 via DC-DC power conversion circuits 402 and 408. To protect the main load 304, subsystem loads 306, and components of the modular energy management system from open-circuit failure conditions, the central controller 310 controls the voltage supplied by each of the energy modules 308 and 410 to the main load within the predetermined normal operating voltage band based on the sensed voltage $V_{sens}$ and a requested voltage $V_{req}$ from the central controller 310. For example, when the open failure of the energy module 410 occurs, the central controller 310 can realign power from the subsystem loads 306 or the other energy modules 308 so that the voltage supplied by the energy module 410 is within the predetermined normal operating voltage band and the main load 304 can continue to operate. Without the central controller 304, the failed energy module 410 can produce unstable load voltages, which can damage the main load 304 and/or the subsystem loads 306.

Figure 5:
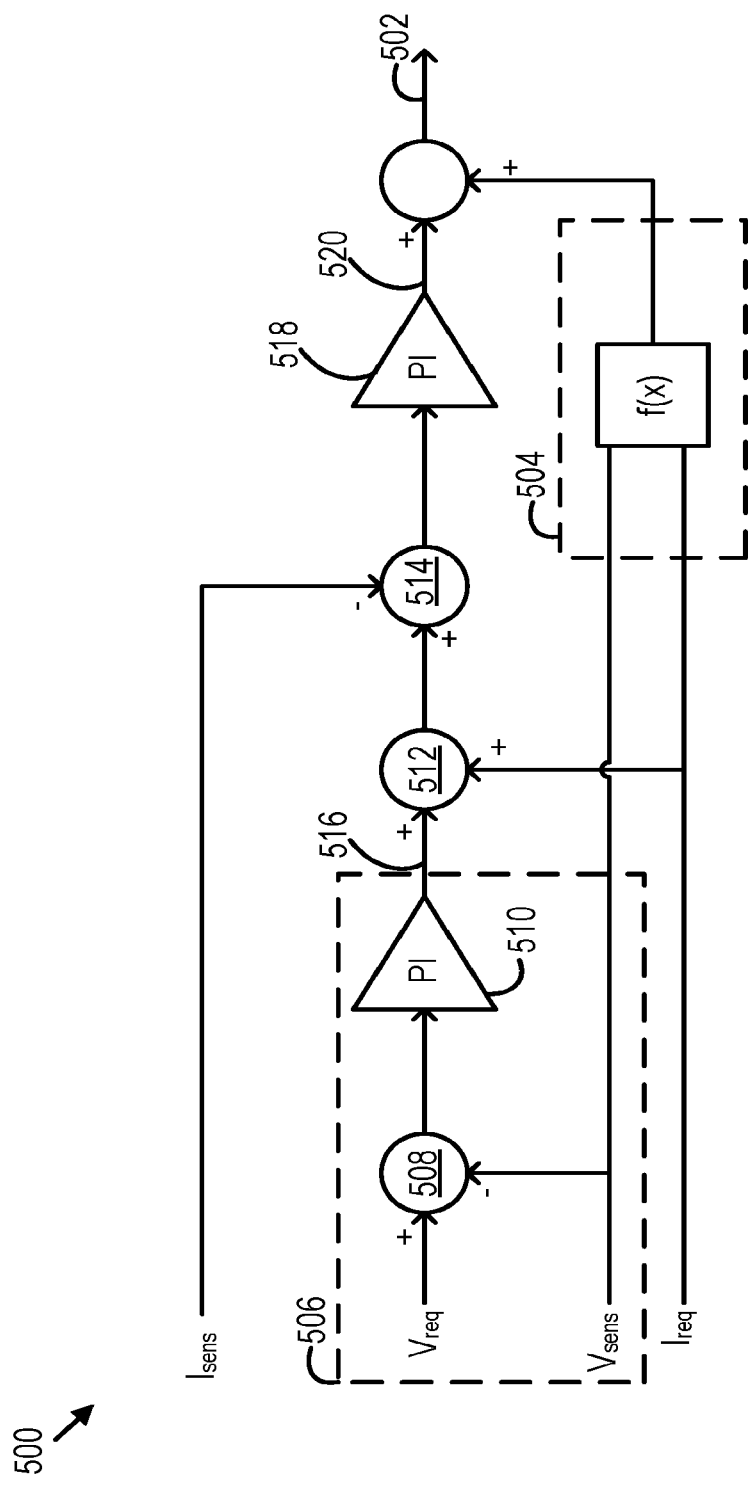
FIG. 5 is an exemplary schematic diagram of a controller for a modular energy management system.

FIG. 5 is an exemplary schematic diagram of a fault control architecture 500 of the central controller 310 of the modular energy management system 300 that illustrates one or more software processes executed by the control circuitry of the central controller 310 in both normal steady-state operations as well as failure operations when an open failure of one or more of the energy modules occurs. The central controller 310 uses the same fault control architecture 500 for both a normal operation mode and a failure operation mode, which provides for smooth transitions between normal operations and fault mode operations without disruptions in power to the main load 304 or subsystem loads 306.

In one implementation, the control circuitry of the central controller 310 calculates a total current command 502 corresponding to an amount of power and/or voltage that is provided by the energy modules 308 of the modular energy management system 300. The total current command can be based on at least one of sensed current $I_{sens}$, requested current $I_{req}$, sensed voltage $V_{sens}$, and requested voltage $V_{req}$. The sensed current $I_{sens}$ and the sensed voltage $V_{sens}$ correspond to sensor values of a voltage sensor and/or current sensor connected to the primary side or the secondary side of the modular DC-DC converter 302. The requested current $I_{req}$ and the requested voltage $V_{req}$ correspond to a desired output current and voltage from the modular DC-DC converter 302 based on load demands.

The fault control architecture includes a voltage control block 506 that calculates an automatic voltage regulation (AVR) current command based on a difference between the requested voltage $V_{req}$ and the sensed voltage $V_{sens}$ calculated at operation block 508. The output from the operation block 508 is input to proportional integrator 510, which produces the AVR current command 516. During the normal operation mode without any failed energy modules, $V_{sens}$ and $V_{req}$ are approximately equal, resulting in the difference between $V_{req}$ and $V_{sens}$ being approximately zero, which means that the total current command 502 is independent of voltage during normal operations. During fault control operations, the difference between $V_{req}$ and $V_{sens}$ increases.

For example, when an open failure occurs as power is transferred from the energy modules 308 to the main load 304, the sensed voltage $V_{sens}$ decreases, which can produce an under voltage (UV) condition. During the UV condition, the central controller 310 sets the requested voltage $V_{req}$ equal to a lower voltage threshold of a predetermined normal operating voltage band so that the total voltage supplied to the main load 304 by the energy modules 308 is not below a minimum operating voltage for the main load 304. In addition, when an open failure occurs as power is transferred from the main load 304 to the energy modules 308, the sensed voltage $V_{sens}$ increases, which can produce an over voltage (OV) condition. During the OV condition, the central controller 310 sets the requested voltage $V_{req}$ equal to an upper voltage of the predetermined normal operating voltage band so that the total voltage supplied to the main load 304 by the energy modules 308 is not greater than a maximum operating voltage for the main load 304. The controller 310 maintains the energy module voltage within the predetermined normal operating voltage band by realigning power flow to the main load through the DC-DC converter 302 of the failed energy module 410 from one or more of the undamaged energy modules 308 or from the subsystem loads 306.

At operation block 512, the AVR current command 516 is added to the requested current $I_{req}$, and the sensed current $I_{sens}$ is subtracted from the output of the operation block 512 at operation block 514. The output of the operation block 514 is input to proportional integrator 518, which produces an automatic current regulation (ACR) current command 520. During the normal operation mode, the ACR current command 520 is based on the differences between the requested current $I_{req}$ and the sensed current $I_{sens}$ calculated at the operation block 514. During fault control operations, the central controller 310 sets the requested current $I_{req}$ equal to zero so that the ACR current command 516 is based on the difference between the AVR current command 516 and the sensed current $I_{sens}$.

Table 1 provides a summary of the requested current $I_{req}$ and requested voltage $V_{req}$ during the normal operation mode and the OV and UV conditions of the fault control mode. During the normal operation mode, $V_{req}$ is equal to $V_{sens}$, and $I_{req}$ is unrestricted. In an UV condition, $V_{req}$ is equal to $V_{min}$, and $I_{req}$ is set to zero. In an OV condition, $V_{req}$ is set to $V_{max}$, and $I_{req}$ is set to zero.

TABLE 1

| Operation Mode | $V_{req}$ | Ireq |
|---|---|---|
| Normal | $V_{sens}$ | Unrestricted |
| UV | $V_{min}$ | Zero |
| OV | $V_{max}$ | Zero |

The total current command 502 is equal to the sum of the ACR current command 516 and an output of a feedforward block 504 that can optionally be included in the fault control architecture 500. The requested current $I_{req}$ and sensed voltage $V_{sens}$ are inputs to the feedforward block 504, which are used to estimate or predict the requested voltage $V_{req}$, which can provide additional stability to the fault control architecture during voltage transients.

In some implementations, the normal operation mode can also be referred to as a power control mode because the total current command 502 is based on controlling an amount of power delivered by the energy modules 308 to the main load and is independent of voltage. The fault control mode can also be referred to as a voltage control mode because the total current command 502 is dependent on the output 516 of the voltage control block 506.

Figure 6:
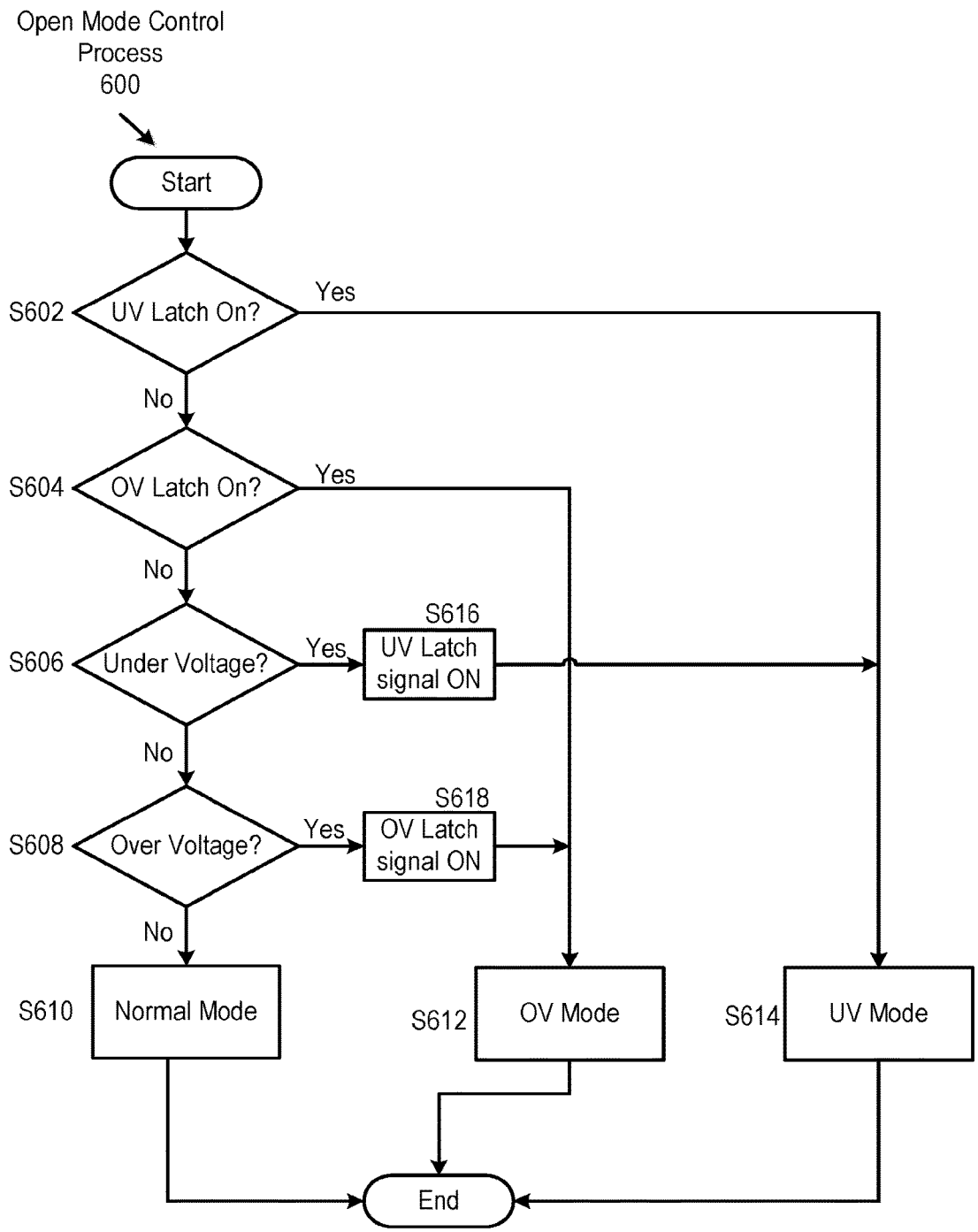
FIG. 6 is an exemplary flowchart of an open mode control process.

FIG. 6 is an exemplary flowchart of an open mode control process 600, which is one implementation of the fault control architecture 500. The open mode control process 600 can be executed by the control circuitry of the controller 310 and can be implemented in both the normal operation mode and the fault control mode that includes both over voltage (OV) and under voltage (UV) conditions. The open mode control process 600 is described with respect to the modular energy management system 300 but can also be implemented in other energy management system configurations. In addition, the open mode control process 600 can also be implemented when open failures or any other type of failures of the energy modules 800 occur.

At step S602, the control circuitry of a controller of the modular energy management system 300 determines whether an under voltage (UV) latch is on. In one implementation, the UV latch is set when the sensed voltage $V_{sens}$ falls below a lower voltage threshold of the predetermined normal operating voltage band for one of the energy modules 308. In addition, the UV latch corresponds to a control signal output by the controller 310 that sets the UV operation mode for one or more of the energy modules 308 when an UV failure is detected, such as an open failure that occurs when power is transferred from the energy modules 308 to the main load 304. If the UV latch is on, resulting in a "yes" at step S602, then step S614 is performed. Otherwise, the UV latch is off, resulting in a "no" at step S602, then step S604 is performed.

At step S604, the control circuitry determines whether an over voltage (OV) latch is on. In one implementation, the OV latch is set when the sensed voltage $V_{sens}$ increases above an upper voltage threshold of the predetermined normal operating voltage band for one of the energy modules 308. In addition, the OV latch corresponds to a control signal output by the controller 310 that sets the OV operation mode for one or more of the energy modules 308 when an OV failure is detected, such as an open failure that occurs when power is transferred from the main load 304 to the energy modules 308. If the OV latch is on, resulting in a "yes" at step S604, then step S612 is performed. Otherwise, the OV latch is off, resulting in a "no" at step S604, then step S606 is performed.

At step S606, the control circuitry determines whether an UV condition exists in one or more of the energy modules 308 where the sensed voltage $V_{sens}$ is less than the lower voltage threshold of the predetermined normal operating voltage band. In some implementations, the control circuitry of the controller 310 determines the lower voltage threshold based on a number of energy modules 308 providing power to the main load 304 or subsystem loads 306, a configuration of the energy modules (e.g., series or parallel), and a minimum voltage at which the main load 304 or subsystem loads 306 can operate without shutting down or damaging components of the main load 304 or subsystem loads 306. If the UV condition exists, resulting in a "yes" at step S606, then step S616 is performed. At step S616, the controller of the modular energy management system 300 sets an UV latch signal to ON, and the open mode control process 600 continues to step S614. Otherwise, if a UV condition does not exist, resulting in a "no" at step S606, then step S608 is performed.

At step S608, the control circuitry determines whether an OV condition exists in one or more of the energy modules 308 where the sensed voltage $V_{sens}$ is greater than the upper voltage threshold of the predetermined normal operating voltage band. In some implementations, the control circuitry of the controller 310 determines the upper voltage threshold based on a number of energy modules 308 providing power to the main load 304 or subsystem loads 306, a configuration of the energy modules (e.g., series or parallel), and a maximum voltage at which the main load 304 or subsystem loads 306 can operate without shutting down or damaging components of the main load 304 or subsystem loads 306. If the OV condition exists, resulting in a "yes" at step S608, then step S618 is performed. At step S618, the controller of the modular energy management system 300 sets an OV latch signal to ON, and the open mode control process 600 continues to step S612. Otherwise, if the OV condition does not exist, resulting in a "no" at step S608, then step S610 is performed.

At step S610, the controller of the modular energy management system 300 operates in the normal operation mode where the fault control architecture 500 is used to determine the total current command 502 output from the controller 310 that controls the amount of power output from the energy modules 308 to the main load 304 or subsystem loads 306. For example, during the normal operation mode without any failed energy modules, $V_{sens}$ and $V_{req}$ are approximately equal, resulting in the difference between $V_{req}$ and $V_{sens}$ being approximately zero, which means that the total current command 502 is independent of voltage during normal operations. In addition, during the normal operation mode, the total current command 502 is based on the difference between the requested current $I_{req}$ and the sensed current $I_{sens}$ plus the output from the feedforward block 504.

At step S612, the controller of the modular energy management system 300 operates in an over voltage (OV) mode where the fault control architecture 500 is used to determine the total current command 502 output from the controller 310 that controls the amount of voltage output from the energy modules 308 to the main load 304 or subsystem loads 306. The controller 310 sets the requested current $I_{req}$ to zero and the requested voltage $V_{req}$ equal to the upper voltage threshold. In addition, the total current command 502 is based on the difference between the output from the voltage control block 506 ($V_{req}-V_{sens}$) and the sensed current $I_{sens}$ plus the output of the feedforward block 504.

At step S614, the controller of the modular energy management system 300 operates in an under voltage (UV)

mode where the fault control architecture 500 is used to determine the total current command 502 output from the controller 310 that controls the amount of voltage output from the energy modules 308 to the main load 304 or subsystem loads 306. The controller 310 sets the requested current $I_{req}$ to zero and the requested voltage $V_{req}$ equal to the lower voltage threshold. In addition, like the OV operation mode, the total current command 502 is based on the difference between the output from the voltage control block 506 ($V_{req}-V_{sens}$) and the sensed current $I_{sens}$ plus the output of the feedforward block 504. The controller 310 maintains the energy module voltage within the predetermined normal operating voltage band by realigning power flow to the main load through the DC-DC converter 302 of the failed energy module 410 from one or more of the undamaged energy modules 308 or from the subsystem loads 306.

Figure 7A:
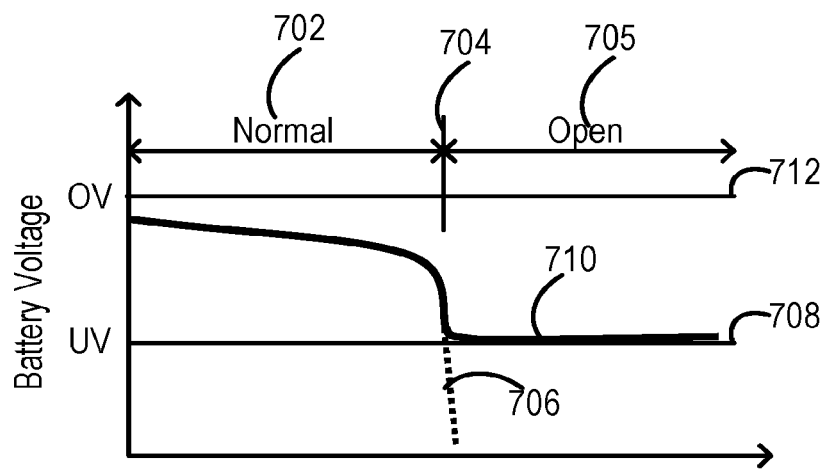
FIG. 7A is an exemplary graph of battery voltage.

FIG. 7A is an exemplary graph of energy module voltage when power is transferred from the energy modules 308 to the main load 304 (e.g., main load >0) and an open failure of an energy module 308 occurs. Implementing the fault control architecture 500 through the open mode control process 600 can ensure that the energy module voltage remains between the upper voltage threshold 712 and the lower voltage threshold 708. During the normal operation mode 702, the energy module voltage slowly decreases as power is transferred from the energy module 308 to the main load 304. When open failure occurs at point 704, the energy module voltage sharply decreases. If the fault control architecture 500 is not used, as shown by curve 706, the energy module voltage decreases below lower voltage threshold 708, and the total voltage supplied to the main load 304 may decrease below a minimum operating voltage, which may cause the main load 304 to shut down or become damaged. During the fault control mode 705 when the fault control architecture 500 and open mode control process 600 are used as shown by curve 710, the energy module voltage remains at or above the lower voltage threshold.

Figure 7B:
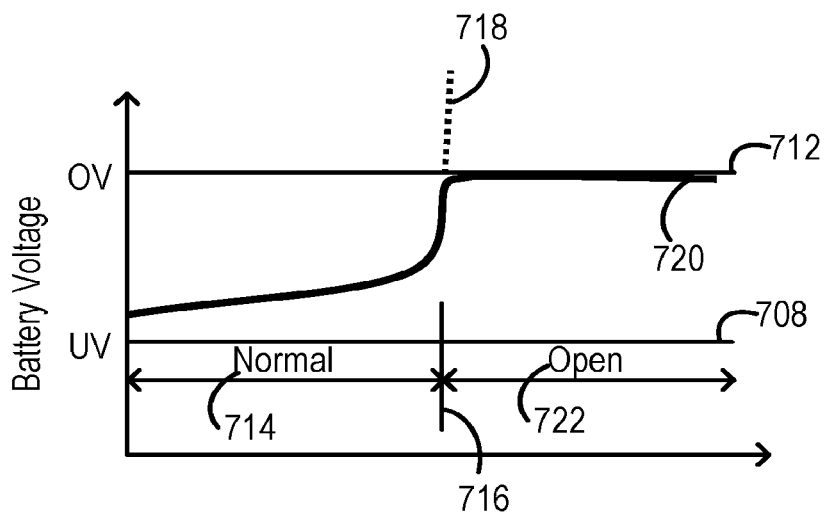
FIG. 7B is an exemplary graph of battery voltage.

FIG. 7B is an exemplary graph of energy module voltage when power is transferred from the main load 304 to the energy modules 308 (e.g., main load <0) and an open failure of an energy module 308 occurs. Implementing the fault control architecture 500 through the open mode control process 600 can ensure that the energy module voltage remains between the upper voltage threshold 712 and the lower voltage threshold 708. During the normal operation mode 714, the energy module voltage slowly increases as power is transferred from the main load 304 to the energy modules 308. When failure occurs at point 716, the energy module voltage sharply increases. If the fault control architecture 500 is not used, as shown by curve 718, the energy module voltage increases above the upper voltage threshold 712, and the total voltage supplied from the main load 304 to the energy modules 308 may increase above a maximum operating voltage, which may cause the main load 304 or the energy module 308 to shut down or become damaged. During the fault control mode 722 when the fault control architecture 500 and open mode control process 600 are used as shown by curve 720, the energy module voltage remains at or below the upper voltage threshold.

Figure 8:
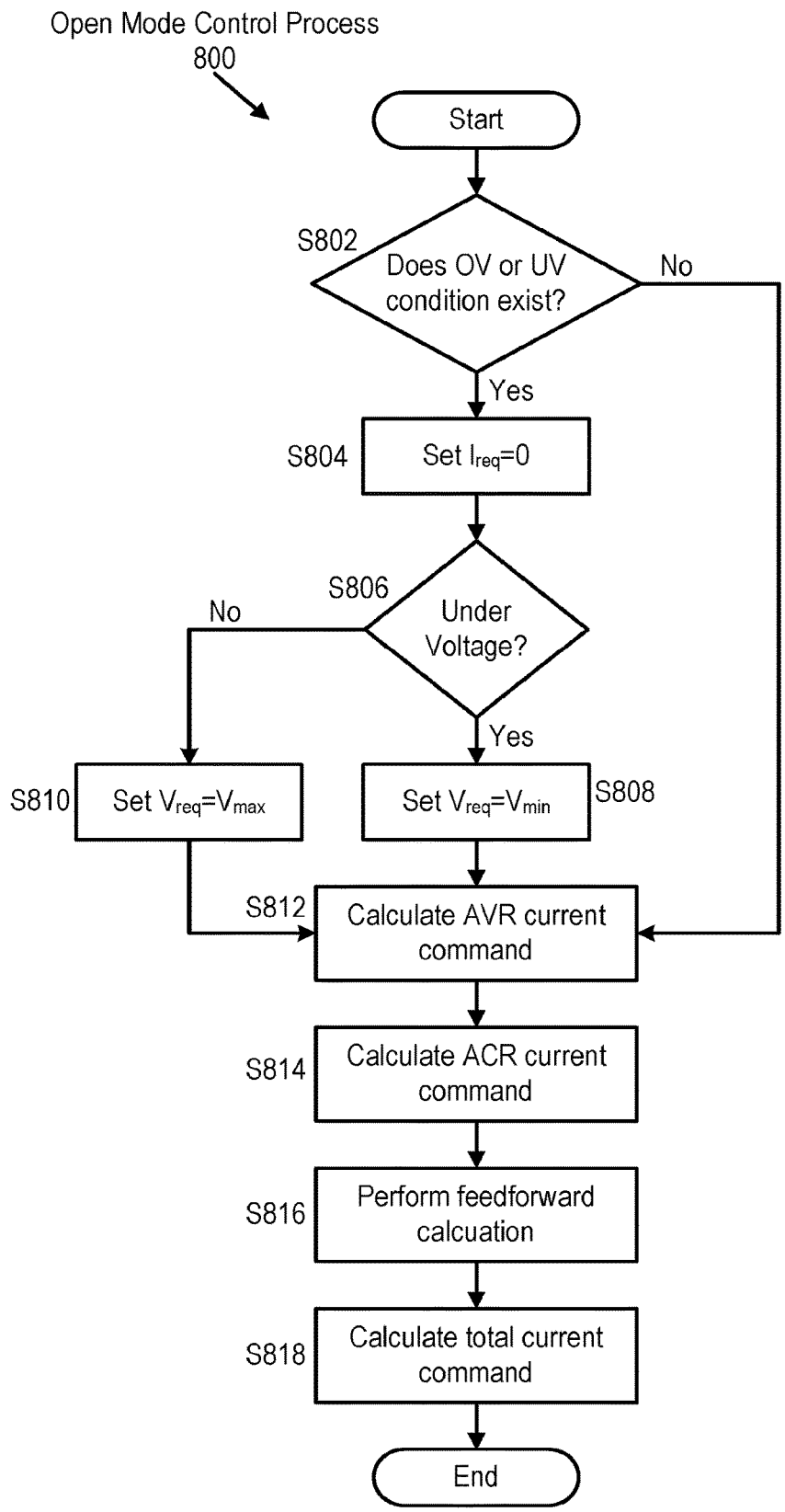
FIG. 8 is an exemplary flowchart of an open mode control process.

FIG. 8 is an exemplary flowchart of an open mode control process 800, which is another implementation of the open mode control process 600 that implements the fault control architecture 500 in the modular energy management system 300. The open mode control process 800 can be executed by the control circuitry of the controller 310 and can be implemented in both the normal operation mode and the fault control mode that includes both over voltage (OV) and under voltage (UV) conditions. The open mode control process 800 is described with respect to the modular energy management system 300 but can also be implemented in other energy management system configurations. In addition, the open mode control process 800 can also be implemented when open failures or any other type of failures of the energy modules 800 occur.

At step S802, the control circuitry of the controller determines if an OV or an UV condition exists in one of the energy modules of the modular energy management system 300. The OV condition exists when the voltage of one or more of the energy modules 308 is greater than the upper voltage threshold, and the UV condition exists when the voltage of one or more of the energy modules 308 is less than the lower voltage threshold. If an OV or UV condition exists in one of the energy modules, resulting in a "yes" at step S802, then step S804 is performed, and the modular energy management system 300 operated in a fault control mode to maintain the voltage of the energy modules within the predetermined normal operating voltage band. Otherwise, if the OV or UV condition does not exist in any of the energy modules, resulting in a "no" at step S802, then step S812 is performed.

In some implementations, at step S802, the determination of whether the OV or UV conditions exist is based on a difference between the requested voltage $V_{req}$ and the sensed voltage $V_{sens}$. For example, the control circuitry may determine that one of the energy modules 308 has failed when the difference between the requested voltage $V_{req}$ and the sensed voltage $V_{sens}$ is greater than a predetermined threshold, and the open mode control process 800 continues to step S806 to implement the fault control mode. Likewise, the control circuitry can implement the normal control mode when the difference between the requested voltage $V_{req}$ and the sensed voltage $V_{sens}$ is less than a predetermined threshold or zero, such as when $V_{req}$ and $V_{sens}$ are equal.

At step S804, if the OV or UV condition exists in one of the energy modules, then the fault control mode is implemented, and the controller 310 sets the requested current $I_{req}$ equal to zero. Setting the requested current $I_{req}$ equal to zero during the fault control mode ensures that the total current command 502 output from the controller 310 is based on the difference between the sensed current and the output of the voltage control block 506 ($V_{req}-V_{sens}$).

At step S806, it is determined whether an UV condition exists. If an UV condition exists in one of the energy modules 308, resulting in a "yes" at step S806, then step S808 is performed. Otherwise, if an OV condition exists in one of the energy modules 308, resulting in a "no" at step S806, then step S810 is performed.

At step S808, if the UV condition exists, then the requested voltage $V_{req}$ is set to the lower voltage threshold of the predetermined normal operating voltage band, which can also be interchangeably referred to as $V_{min}$. Setting the requested voltage Vreq equal to the lower voltage threshold ensures that the voltage of the energy module 308 in the fault control mode is maintained at or greater than the lower voltage threshold.

At step S810, if the OV condition exists, then a requested voltage $V_{req}$ is set to the upper voltage threshold of the predetermined normal operating voltage band, which can also be interchangeably referred to as $V_{max}$. Setting the requested voltage $V_{req}$ equal to the upper voltage threshold ensures that the voltage of the energy module 308 in the fault control mode is maintained at or less than the upper voltage threshold.

At step S812, during both the normal operation mode and the fault control mode, the controller 310 calculates a current command associated with automatic voltage regulation (AVR) at the voltage control block 506. The AVR current command 516 is calculated based on a difference between the requested voltage $V_{req}$ and the sensed voltage $V_{sens}$. The output from the operation block 508 is input to proportional integrator 510, which produces the AVR current command 516. During the normal operation mode without any failed energy modules, $V_{sens}$ and $V_{req}$ are approximately equal, resulting in the difference between $V_{req}$ and $V_{sens}$ being approximately zero, which means that the total current command 502 is independent of voltage during normal operations. During fault control operations, the difference between $V_{req}$ and $V_{sens}$ increases, resulting in an increase in the AVR current command 516.

At step S814, the controller calculates a current command associated with automatic current regulation (ACR). At operation block 512 of the fault control architecture 500, the AVR current command 516 is added to the requested current $I_{req}$, and the sensed current $I_{sens}$ is subtracted from the output of the operation block 512 at operation block 514. The output of the operation block 514 is input to proportional integrator 518, which produces an automatic current regulation (ACR) current command 520. During the normal operation mode, the ACR current command 520 is based on the differences between the requested current $I_{req}$ and the sensed current $I_{sens}$ calculated at the operation block 514. During fault control operations, the central controller 310 sets the requested current $I_{req}$ equal to zero so that the ACR current command 516 is based on the difference between the AVR current command 516 and the sensed current $I_{sens}$.

At step S816, the control circuitry of the controller performs a feedforward calculation. The requested current $I_{req}$ and sensed voltage $V_{sens}$ are inputs to the feedforward block 504, which are used to estimate or predict the requested voltage $V_{req}$, which can provide additional stability to the fault control architecture during voltage transients. Step S816 may not be performed, according to some implementations.

At step S818, the control circuitry of the controller calculates the total current command 502 as equal to the sum of the ACR current command 516 and an output of a feedforward block 504. In some implementations, the normal operation mode can also be referred to as a power control mode because the total current command 502 is based on controlling an amount of power delivered by the energy modules 308 to the main load and is independent of voltage. The fault control mode can also be referred to as a voltage control mode because the total current command 502 is dependent on the output 516 of the voltage control block 506.

Aspects of this disclosure are related to controlling power transfer from energy modules to electrical loads. In some implementations, the central controller 310 issues control signals to align the energy modules 310 to provide power to the main load 304 and subsystem loads 308 within the predetermined normal operating voltage band. When open failures of one or more of the energy modules 308 occur, the controller 310 ensures that the energy module voltage of the failed energy module does not fall below the lower voltage threshold or increase above the upper voltage threshold. In addition, the total current command 502 output from the controller 310 is computed with the same fault control architecture during both the normal operation mode and the fault control operation mode which provides for smooth transitions between normal operations and fault mode operations without disruptions in power to the main load 304 or subsystem loads 306.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 9:
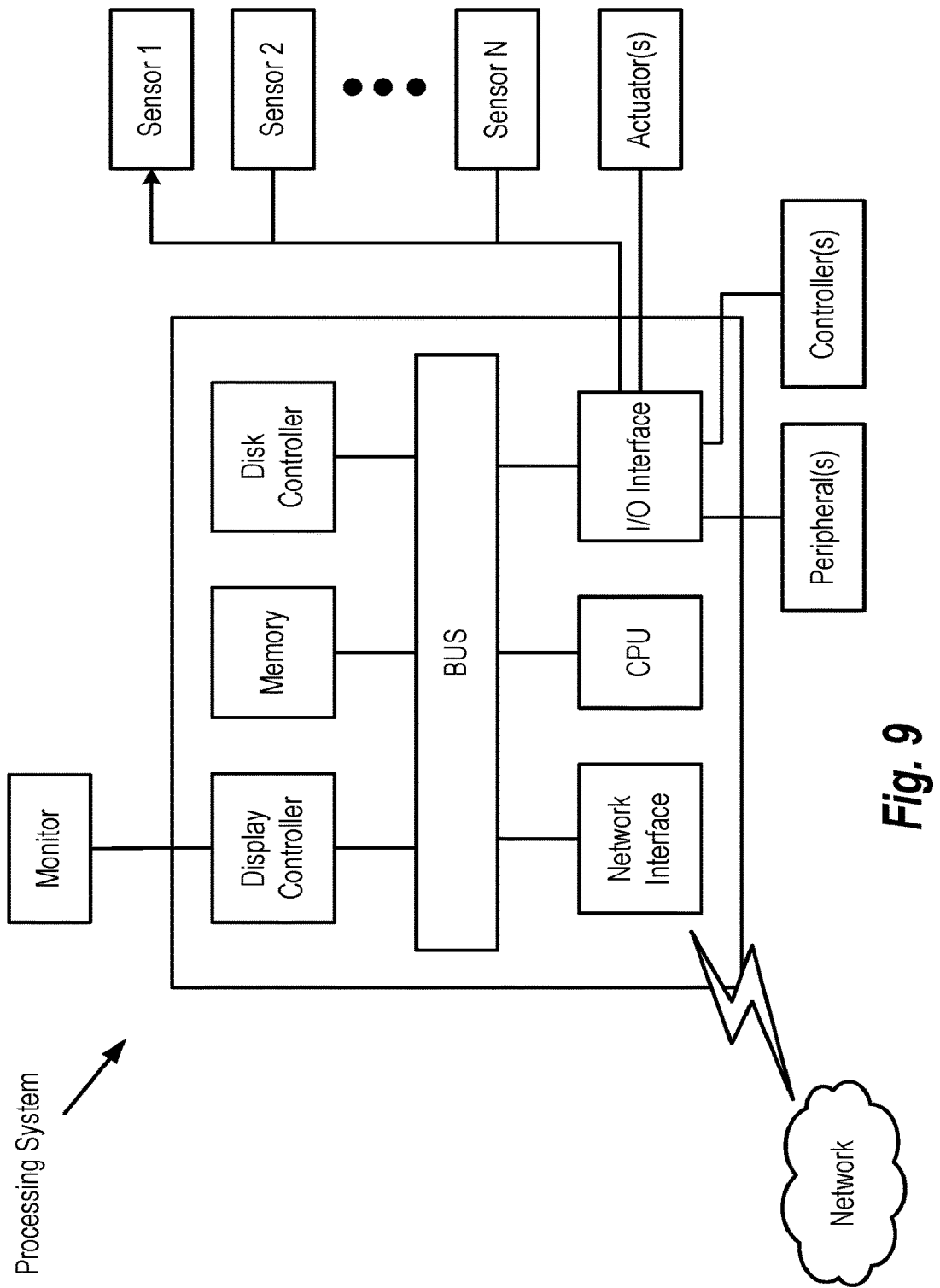
FIG. 9 schematically illustrates a processing system for a processing system, such as a controller and/or a computer system.

FIG. 9 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the modular energy management system. For example, the user can use the controller to select energy modules to provide power to one or more auxiliary electrical loads. The I/O interface can also provide an interface for outputting control signals to one or more actuators to control various actuated components, including DC-DC conversion circuitry and other circuitry in the modular energy management system. In some implementations, the actuators send control signals to align transmitter and receiver antennas of the local controller and central controller 310 to send and receive sensor data, control signals, and the like.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:
1. A system comprising:
  energy modules configured to output power to at least one load based on load demands; and
  control circuitry configured to
    control an amount of power transferred from each of the energy modules to the at least one load based on received sensor data from the energy modules, detect failure of at least one source cell of the energy modules based on the received sensor data from the energy modules, control a voltage supplied by the energy modules to the at least one load within a predetermined operating band when the failure is detected, and predict a current command corresponding to the amount of power or voltage supplied by the energy modules based on a requested current and a sensed voltage.

2. The system of claim 1, wherein the energy modules include
at least one source cell configured to provide power to the at least one load;
DC-DC power conversion circuitry configured to convert a voltage of the at least one source cell to a voltage of the energy management bus; and
at least one sensor device configured to measure at least one of a temperature, the voltage, a current, a rate of power discharge, or a state of charge of the energy modules.

3. The system of claim 2, wherein the at least one source cell includes at least one of a battery cell, a solar cell, a fuel cell, or an AC charging cell.

4. The system of claim 1, wherein the control circuitry is further configured to align power to the at least one load from one or more additional energy modules or subsystems when the failure is detected.

5. The system of claim 1, wherein the control circuitry is further configured to output a current command to modify an amount of power supplied by the energy modules based on at least one of a sensed current, a requested current, a sensed voltage, or a requested voltage.

6. The system of claim 1, wherein the control circuitry is further configured to operate in a normal operation mode when a difference between a requested voltage and a sensed voltage for one of the energy modules is less than or equal to a predetermined threshold or zero.

7. The system of claim 6, wherein the control circuitry is further configured to output a current command to modify the amount of power supplied by the energy modules based on a difference between a requested current and a sensed current when operating in the normal operation mode.

8. The system of claim 1, wherein failure of at least one source cell of the energy modules corresponds to an open failure.

9. The system of claim 1, wherein the control circuitry is further configured to operate in a failure mode when a difference between a requested voltage and a sensed voltage for one of the energy modules is greater than a predetermined threshold.

10. The system of claim 9, wherein the control circuitry is further configured to output a current command to modify the voltage supplied by the energy modules based on a sensed current minus the difference between the requested voltage and the sensed voltage.

11. The system of claim 9, wherein the control circuitry is further configured to set a requested current equal to zero when operating in the failure mode.

12. The system of claim 9, wherein the control circuitry is further configured to determine that an under voltage failure has occurred when a direction of power flow is from the energy modules to the at least one load and the sensed voltage is less than a lower voltage threshold of the predetermined operating band.

13. The system of claim 12, wherein the control circuitry is further configured to set the requested voltage equal to the lower voltage threshold when the under voltage failure occurs.

14. The system of claim 9, wherein the control circuitry is further configured to determine that an over voltage failure has occurred when a direction of power flow is from the at least one load to the energy modules and the sensed voltage is greater than an upper voltage threshold of the predetermined operating band.

15. The system of claim 14, wherein the control circuitry is further configured to set a requested voltage equal to the upper voltage threshold when the over voltage failure occurs.

16. The system of claim 1, wherein the control circuitry is further configured to determine an upper voltage threshold and a lower voltage threshold of the predetermined operating band based on a voltage of the at least one load and a number of the energy modules supplying power to the at least one load.

17. A method comprising:
controlling an amount of power transferred from energy modules to at least one load based on received sensor data from the energy modules;
detecting failure of at least one source cell of the energy modules based on the received sensor data from the energy modules;
controlling a voltage supplied by the energy modules to at the least one load within a predetermined operating band when the failure is detected; and
predicting a current command corresponding to the amount of power or voltage supplied by the energy modules based on a requested current and a sensed voltage.

18. A non-transitory computer-readable storage medium including executable instructions, which when executed by circuitry, causes the circuitry to perform the method according to claim 17.

19. A system controller comprising:
circuitry configured to
control an amount of power transferred from energy modules to at least one load based on received sensor data from the energy modules,
detect failure of at least one source cell of the energy modules based on the received sensor data from the energy modules,
control a voltage supplied by the energy modules to the at least one load within a predetermined operating band when the failure is detected, and
predict a current command corresponding to the amount of power or voltage supplied by the energy modules based on a requested current and a sensed voltage.

* * * * *